(12) United States Patent  (10) Patent No.: US 9,091,586 B2
Hague et al.  (45) Date of Patent: Jul. 28, 2015

(54) PAYLOAD DETERMINATION SYSTEM AND METHOD

(71) Applicant: Caterpillar Inc., Peoria, IL (US)

(72) Inventors: Michael Evan Hague, Washington, IL (US); Sameer Marathe, Yorkville, IL (US)

(73) Assignee: Caterpillar Inc., Peoria, IL (US)

( * ) Notice: Subject to any disclaimer, the term of this patent is extended or adjusted under 35 U.S.C. 154(b) by 302 days.

(21) Appl. No.: 13/853,488

(22) Filed: Mar. 29, 2013

(65) Prior Publication Data

US 2014/0291038 A1   Oct. 2, 2014

(51) Int. Cl.
*G01G 19/10* (2006.01)
*G01G 5/04* (2006.01)
*E02F 3/43* (2006.01)
*G01G 19/08* (2006.01)

(52) U.S. Cl.
CPC ............... *G01G 19/10* (2013.01); *E02F 3/431* (2013.01); *G01G 5/04* (2013.01); *G01G 19/083* (2013.01)

(58) Field of Classification Search
CPC ... G01G 19/083; G01G 19/086; G01G 19/10; E02F 3/431
See application file for complete search history.

(56) References Cited

U.S. PATENT DOCUMENTS

| | | | | |
|---|---|---|---|---|
| 4,230,196 A | * | 10/1980 | Snead | 177/141 |
| 4,854,406 A | * | 8/1989 | Appleton et al. | 177/139 |
| 4,919,222 A | * | 4/1990 | Kyrtsos et al. | 177/139 |
| 5,195,418 A | * | 3/1993 | Smith | 91/31 |
| 5,230,393 A | * | 7/1993 | Mezey | 177/139 |
| 5,245,137 A | * | 9/1993 | Bowman et al. | 177/139 |
| 5,929,389 A | * | 7/1999 | Keuper | 177/141 |
| 6,518,519 B1 | | 2/2003 | Crane, III et al. | |
| 7,495,185 B2 | | 2/2009 | Takeda et al. | |
| 8,515,627 B2 | * | 8/2013 | Marathe et al. | 701/50 |
| 2006/0100808 A1 | * | 5/2006 | Lueschow et al. | 702/101 |
| 2008/0169131 A1 | | 7/2008 | Takeda et al. | |
| 2010/0161184 A1 | * | 6/2010 | Marathe et al. | 701/50 |
| 2010/0161185 A1 | | 6/2010 | Marathe et al. | |
| 2014/0167971 A1 | * | 6/2014 | Stanley et al. | 340/666 |

(Continued)

FOREIGN PATENT DOCUMENTS

DE    3220143 A1 *  3/1983   ............... G01G 5/04
EP    2 511 677      10/2012

(Continued)

*Primary Examiner* — Randy W Gibson
(74) *Attorney, Agent, or Firm* — Finnegan, Henderson, Farabow, Garrett & Dunner, LLP

(57) ABSTRACT

In an exemplary embodiment of the present disclosure, a payload determination method associated with a machine includes determining first head-end and first rod-end pressures of a first actuator operably connected to a boom of the machine as the boom is raised across a position at a reference lift angle. The method further includes determining first head-end and first rod-end pressures of a second actuator operably connected to a work tool of the machine as the boom is raised across the position. The method further includes determining a weight of a payload carried by the work tool based on the first head-end pressure of the first actuator, the first rod-end pressure of the first actuator, the first head-end pressure of the second actuator, the first rod-end pressure of the second actuator, and a determined pitch angle of the machine. In such an exemplary method, the payload is carried by the work tool during at least one of the determining steps described above.

20 Claims, 5 Drawing Sheets

(56) References Cited

U.S. PATENT DOCUMENTS

2014/0291038 A1* 10/2014 Hague et al. ...................... 177/1
2015/0002303 A1* 1/2015 Stanley et al. ................ 340/666

FOREIGN PATENT DOCUMENTS

| GB | 1 372 159 | 10/1974 |
| WO | WO 2006/098645 | 9/2006 |

* cited by examiner

PAYLOAD DETERMINATION SYSTEM AND METHOD

TECHNICAL FIELD

The present disclosure relates generally to a machine having a work tool and, more particularly, to systems and methods for determining the weight of a payload carried by the work tool.

BACKGROUND

Mobile machines have been used at worksites such as mines, construction zones, and/or other similar environments to lift, carry, relocate, excavate, and/or otherwise act on material at the worksite. For example, a number of loaders may be used at a mine or other like excavation site to remove earthen material and transport the material to a waiting haul truck. Typically, such loaders are wheeled or tracked vehicles having a large work tool, such as a bucket, at one end thereof. Such loaders also typically include various linkages and actuators used for raising, lowering, racking, unracking, and/or otherwise manipulating the work tool.

In various applications, it may be useful to know the weight of a payload carried by the work tool of such vehicles. For example, on-highway haul trucks must abide by laws restricting the total weight of the material carried in their beds. Depending on the density and other characteristics of the payload deposited into haul truck beds by the loaders described above, it may be possible to load more than the maximum allowed weight into the bed of such trucks. In addition to violating applicable laws, such excessive weights may also have a detrimental effect on the suspension, drive train, and/or other components of the haul truck. Moreover, in mining and/or other applications in which material is sold according to weight, knowing the weight of the payload carried by such loaders, and deposited into the respective haul truck beds, may be paramount to calculating an accurate cost of the loaded material.

Typically, loaders used in such applications include payload systems configured to determine the weight of the payload carried by their respective work tools in real time. Occasionally, such systems must be calibrated at the worksite to ensure consistent and accurate weight determinations. Calibrating these systems generally requires either a large scale onto which the loader may be driven while carrying a payload, or a large object having a precisely-known weight sufficient for loading the actuators and/or linkages associated with the work tool. Often, however, neither a large enough scale nor a large object of known weight is present at the worksite. In order to calibrate the payload system in such situations, it may be necessary to determine the weight of a payload carried by work tool using other means.

U.S. Pat. No. 5,929,389 to Keuper, issued Jul. 27, 1999 ("the '389 patent"), describes an exemplary system for determining the weight of a load carried by a mobile vehicle. The system disclosed in the '389 patent includes a hydraulic cylinder used to raise and lower the load, a pressure sensor for measuring the pressure of the hydraulic cylinder, and a position sensor for measuring the position of a linkage associated with the cylinder. The system of the '389 patent also includes a pitch sensor for measuring the pitch of the vehicle and a processor in communication with the pressure, position, and pitch sensors. According to the '389 patent, the processor may be able to determine the weight of the load carried by the vehicle based on signals received from the respective sensors.

Although the system of the '389 patent may be capable of determining the weight of a load carried by a vehicle, such systems may not be relied upon to provide an accurate measurement of weight. For example, the disclosed system measures only a single pressure associated with a single hydraulic cylinder of the vehicle. Additionally, the disclosed system and/or weight determination method does not include provisions minimizing the effects of system friction, cylinder seal resistance, and/or other sources of measurement error. Moreover, the disclosed method does not locate the linkages of the vehicle at a repeatable reference position when measuring the various pressures, positions, etc. Due to these factors, the resulting weight determination made by the system of the '389 patent may not be sufficiently accurate for calibration purposes.

The disclosed embodiments are directed to overcoming one or more of the problems set forth above and/or other problems of the prior art.

SUMMARY

In an exemplary embodiment of the present disclosure, a payload determination method associated with a machine includes raising a boom of the machine from a first position at a minimum lift angle of the boom to a second position at a maximum lift angle of the boom. The method also includes determining first head-end and first rod-end pressures of a first actuator operably connected to the boom as the boom is raised across a third position at a reference lift angle of the boom between the minimum and maximum lift angles. The method further includes determining first head-end and first rod-end pressures of a second actuator operably connected to a work tool of the machine as the boom is raised across the third position. The method also includes lowering the boom from the second position to the first position, determining second head-end and second rod-end pressures of the first actuator as the boom is lowered across the third position, and determining second head-end and second rod-end pressures of the second actuator as the boom is lowered across the third position. The method further includes determining a weight of a payload carried by the work tool based on the first and second head-end pressures of the first actuator, the first and second rod-end pressures of the first actuator, the first and second head-end pressures of the second actuator, the first and second rod-end pressures of the second actuator, and a determined pitch angle of the machine. In such an exemplary method, the payload is carried by the work tool during at least one of the determining steps described above.

In another exemplary embodiment of the present disclosure, a payload determination method associated with a machine includes lowering a boom of the machine to a first position at a minimum lift angle of the boom, unracking a bucket of the machine connected to the boom, and racking the bucket. The method also includes raising the boom from the first position to a second position at a maximum lift angle of the boom, and determining first head-end and first rod-end pressures of a first hydraulic cylinder operably connected to the boom as the boom is raised across a third position at a reference lift angle of the boom between the minimum and maximum lift angles. In such embodiments, the reference lift angle comprises a target lift angle modified by a determined pitch angle of the machine. The exemplary method also includes determining first head-end and first rod-end pressures of a second hydraulic cylinder operably connected to the bucket as the boom is raised across the third position. Such a method further includes lowering the boom from the second position to the first position, determining second head-end and second rod-end pressures of the first hydraulic cylinder as the boom is lowered across the third position, and determining second head-end and second rod-end pressures of the second hydraulic cylinder as the boom is lowered across the third position. The method also includes disposing a payload within the bucket and repeating at least one of the steps above while the bucket is loaded with the payload. The method further includes determining a weight of the payload. In such a method, the determined weight is based on each of the hydraulic cylinder pressures determined with the bucket substantially empty, each of the hydraulic cylinder pressures determined with the bucket loaded with the payload, and the determined pitch angle of the machine.

In a further exemplary embodiment of the present disclosure, a machine includes a frame, an engine supported by the frame, a boom coupled to the frame, and a first hydraulic cylinder operably connected to the frame and configured to move the boom relative to the frame. The machine further includes a bucket coupled to the boom, a second hydraulic cylinder operably connected to the frame and configured to move the bucket relative to the boom, and a controller operably connected to the first and second hydraulic cylinders. Such an exemplary controller is configured to raise the boom from a first position at a minimum lift angle of the boom to a second position at a maximum lift angle of the boom. The controller is also configured to determine first head-end and first rod-end pressures of the first hydraulic cylinder as the boom is raised across a third position at a reference lift angle of the boom between the minimum and maximum lift angles. The controller is further configured to determine first head-end and first rod-end pressures of the second hydraulic cylinder as the boom is raised across the third position. The controller is also configured to lower the boom from the second position to the first position, determine second head-end and second rod-end pressures of the first hydraulic cylinder as the boom is lowered across the third position, and determine second head-end and second rod-end pressures of the second hydraulic cylinder as the boom is lowered across the third position. The controller is further configured to determine a weight of a payload carried by the bucket based on the first and second head-end pressures of the first hydraulic cylinder, the first and second rod-end pressures of the first hydraulic cylinder, the first and second head-end pressures of the second hydraulic cylinder, the first and second rod-end pressures of the second hydraulic cylinder, and a determined pitch angle of the machine. In such embodiments, the payload is carried by the work tool during at least one of the steps described above.

DETAILED DESCRIPTION

Figure 1:
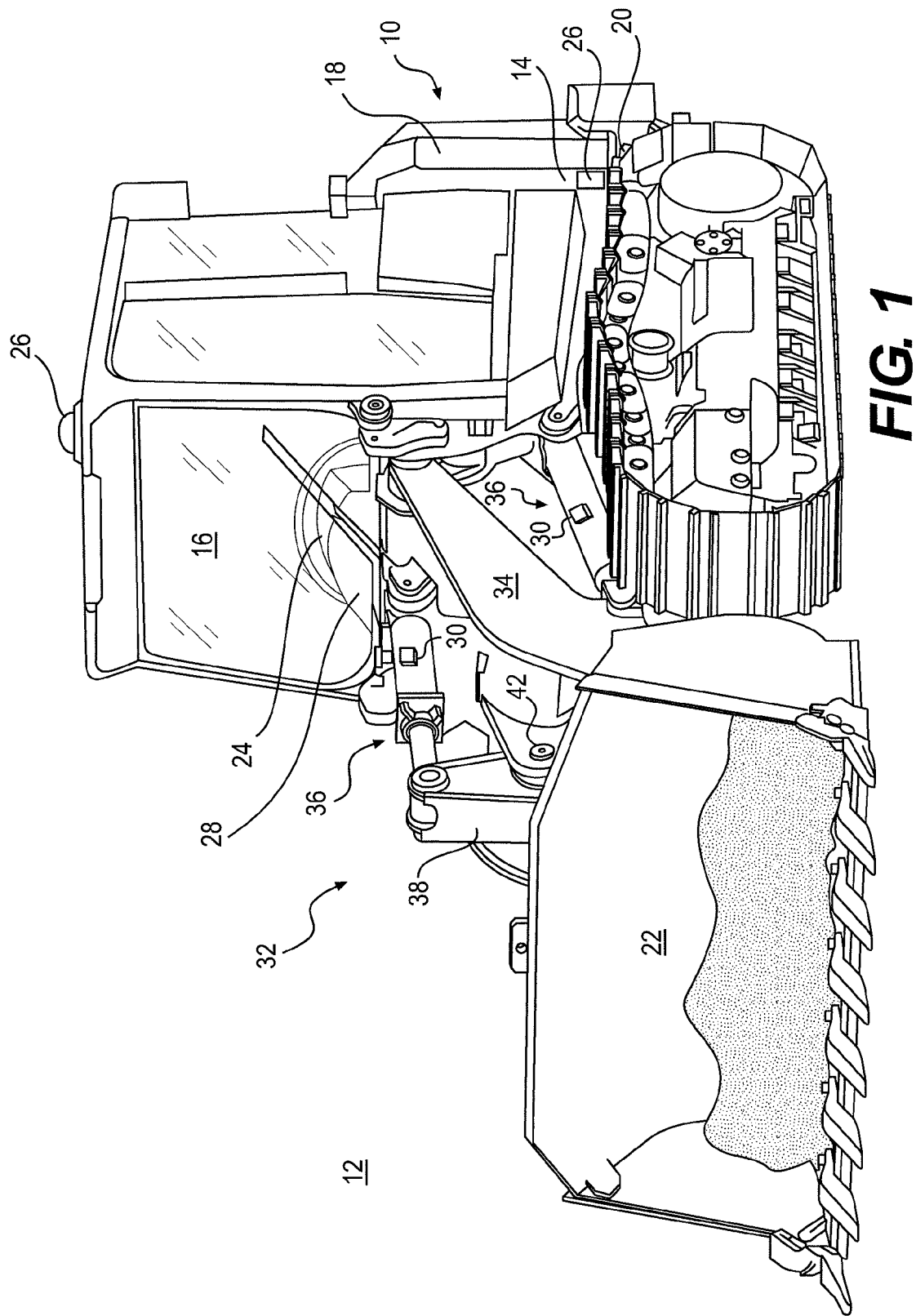
FIG. 1 is a diagrammatic illustration of an exemplary disclosed machine.

FIG. 1 illustrates an exemplary machine 10 operating at a worksite 12. Machine 10 may be a mobile machine that performs some type of operation associated with an industry such as mining, construction, farming, transportation, or any other industry known in the art. Exemplary operations include, among others, carrying, digging, excavating, dozing, hauling, ripping, scraping, etc. Accordingly, machine 10 may be an earth moving machine such as a carry dozer (shown in FIG. 1), a scraper, an agricultural tractor, a wheel loader, a haul truck, or another machine known in the art that is configured to move earthen material at worksite 12. Machine 10 may generally include a frame 14 that at least partially defines or supports an operator station 16, one or more engines 18 mounted to and/or otherwise supported by frame 14, a plurality of traction devices 20 driven by engine 18 to propel machine 10, and an implement system 32 including a boom 34 and a work tool 22. Boom 34 may operatively connect work tool 22 to frame 14, and components of implement system 32 may be powered by engine 18.

Operator station 16 may be equipped with one or more interface devices 24 located proximate an operator seat (not shown) and configured to exchange information (e.g., performance data, worksite records, control commands, etc.) with an operator of machine 10. These interface devices 24 may include, among other things, a monitor, a joystick, a pedal, a keypad, a lever, and/or any other device known in the art. Interface devices 24 may be configured to generate and receive signals corresponding to operation of the machine, calibration exercises, and/or other like signals or information.

In exemplary embodiments, one of interface devices 24 may include a monitor that provides a graphics user interface (GUI) for presentation of worksite, calibration, and/or machine operation information. The monitor may be a computer console or cab-mounted monitor, an LCD screen, a plasma screen, or another similar device that receives instructions and displays corresponding information. It is contemplated that the monitor may also be configured to receive input from the operator regarding desired modes and/or display functionality, for example by way of a touch screen interface or physical buttons and switches, if desired.

Engine 18 may be an internal combustion engine configured to combust a mixture of fuel and air to produce a mechanical power output. For example, engine 18 may include a diesel engine, a gasoline engine, a gaseous fuel-powered engine, or another type of combustion engine apparent to one skilled in the art. It is contemplated, however, that engine 18 may alternatively embody a non-combustion source of power such as a fuel cell, a battery, or another source known in the art. Engine 18 may include an output shaft coupled to various components of machine 10 via one or more belts, gears, or other like coupling devices. For example, the output shaft of engine 18 may be coupled to one or more hydraulic pumps of machine 10 configured to selectively provide pressurized fluid to components of implement system 32, thereby powering such components and facilitating activation and/or movement thereof.

Traction devices 20, in the disclosed embodiment, are tracks located at opposing sides of machine 10. Each track may be independently driven to turn machine 10 or simultaneously and dependently driven to propel machine 10 in a straight direction. It is contemplated that one or all of traction devices 20 may be replaced with another type of traction device, if desired, such as belts or wheels. In these situations, steering of machine 10 may be implemented by pivoting and/or tilting the traction devices, as is known in the art.

As machine 10 is propelled about worksite 12 by traction devices 20, the position, pitch, and/or orientation of machine 10 may be determined by way of a locating device 26. In exemplary embodiments, locating device 26 may be configured to determine a position of machine 10 and generate a signal indicative thereof. In such embodiments, locating device 26 could embody, for example, a global satellite system device (e.g., a GPS or GNSS device), an Inertial Reference Unit (IRU), a local tracking system, a laser range finding device, an odometric or dead-reckoning device, or any other known locating device that receives or determines positional information associated with machine 10.

In some embodiments, locating device 26 may additionally include an orientation sensor such as a laser-level sensor, a pitch sensor, a tilt sensor, an inclinometer, a radio direction finder, a gyrocompass, a fluxgate compass, or another device to determine heading, angular orientation, and/or other positional information associated with machine 10. Locating device 26 may be configured to convey a signal indicative of such information to one or more of interface devices 24 (e.g., to the monitor) for display. For example, interface devices 24 may display an image of machine 10 positioned within worksite 12 based on one or more corresponding signals received from locating devices 26. Such signals may also be directed to a controller 28 associated with machine 10 and/or worksite 12 for further processing. It is understood that such signals may include information indicative of an angle of incline or decline relative to a horizontal axis (i.e., a pitch angle) associated with frame 14, work tool 22, and/or machine 10, generally. Such signals may be indicative of, for example, the incline, decline, and/or grade of the worksite surface on which machine 10 is disposed. As will be described below, such pitch angle information may be used to assist in determining the weight of a payload carried by work tool 22.

Work tool 22 may be supported by frame 14 and boom 34, powered by engine 18, and controllable and/or monitored via interface devices 24. Work tool 22 may include any device used to perform a particular task such as, for example, a bucket (shown in FIG. 1), a blade, a fork arrangement, a shovel, a dump bed, or any other task-performing device known in the art. Although connected in the embodiment of FIG. 1 to lift, pivot, and tilt relative to machine 10, work tool 22 may alternatively or additionally rotate, slide, extend, or move in another manner known in the art. Work tool 22 may be made from any metal, alloy, and/or other like material, and may comprise any desired shape. For example, work tool 22 may include a substantially planar base forming at least a portion of a substantially concave enclosure having an opening disposed and/or facing away from boom 34. In exemplary embodiments, work tool 22 may have any shape and/or other configuration capable of carrying a payload of earthen material, debris, or other known worksite materials. Work tool 22 may also have a back wall connected to the base opposite the opening. Boom 34 may be pivotally coupled to the back wall of work tool 22 and/or to one or more sidewalls of work tool 22. The back wall, base, and sidewalls of work tool 22 may be configured to assist work tool 22 in loading, carrying, and/or unloading the payload.

Boom 34 may comprise a substantially rigid elongate structure or linkage configured to movably couple work tool 22 to machine 10. In exemplary embodiments, machine 10 may include a pair of substantially parallel booms 34 pivotally coupled to frame 14. For ease of description, however, the substantially parallel booms 34 of machine 10 may be collectively referred to herein as a single boom 34. Such descriptions of boom 34 should not be construed as limiting the present disclosure to machines 10 having only a single boom 34. In exemplary embodiments, a first end of boom 34 may be pivotally coupled to frame 14 proximate operator station 16, and a second end of boom 34 may be pivotally coupled to work tool 22.

Figure 3:
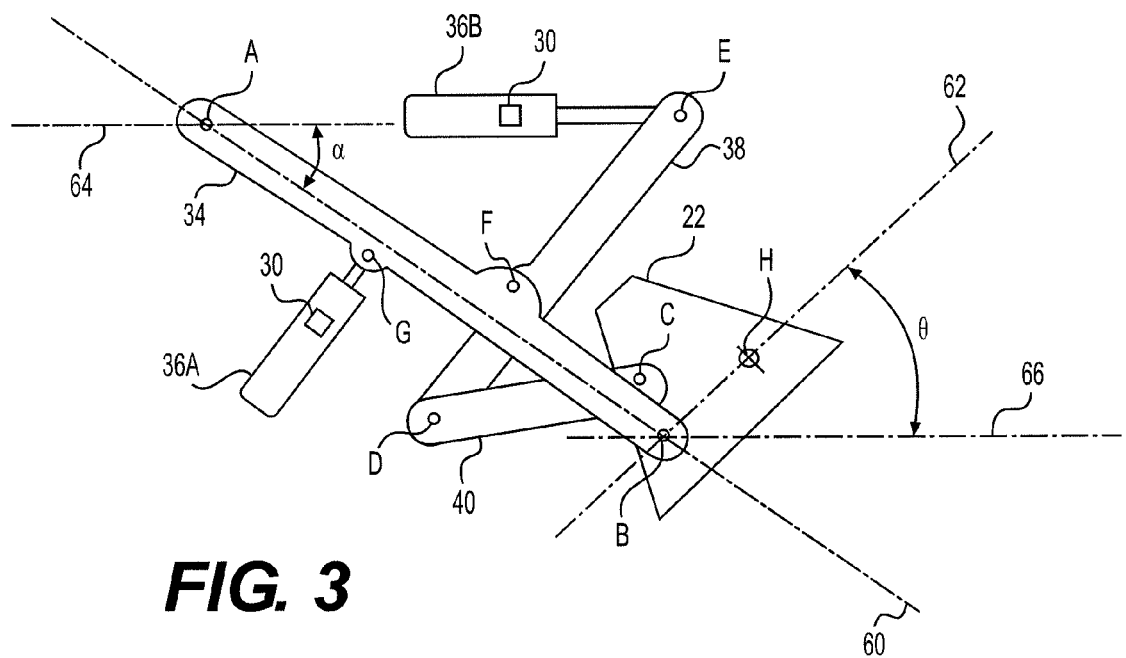
FIG. 3 is a partial schematic illustration of an implement system associated with the machine of FIG. 1.
Figure 4:
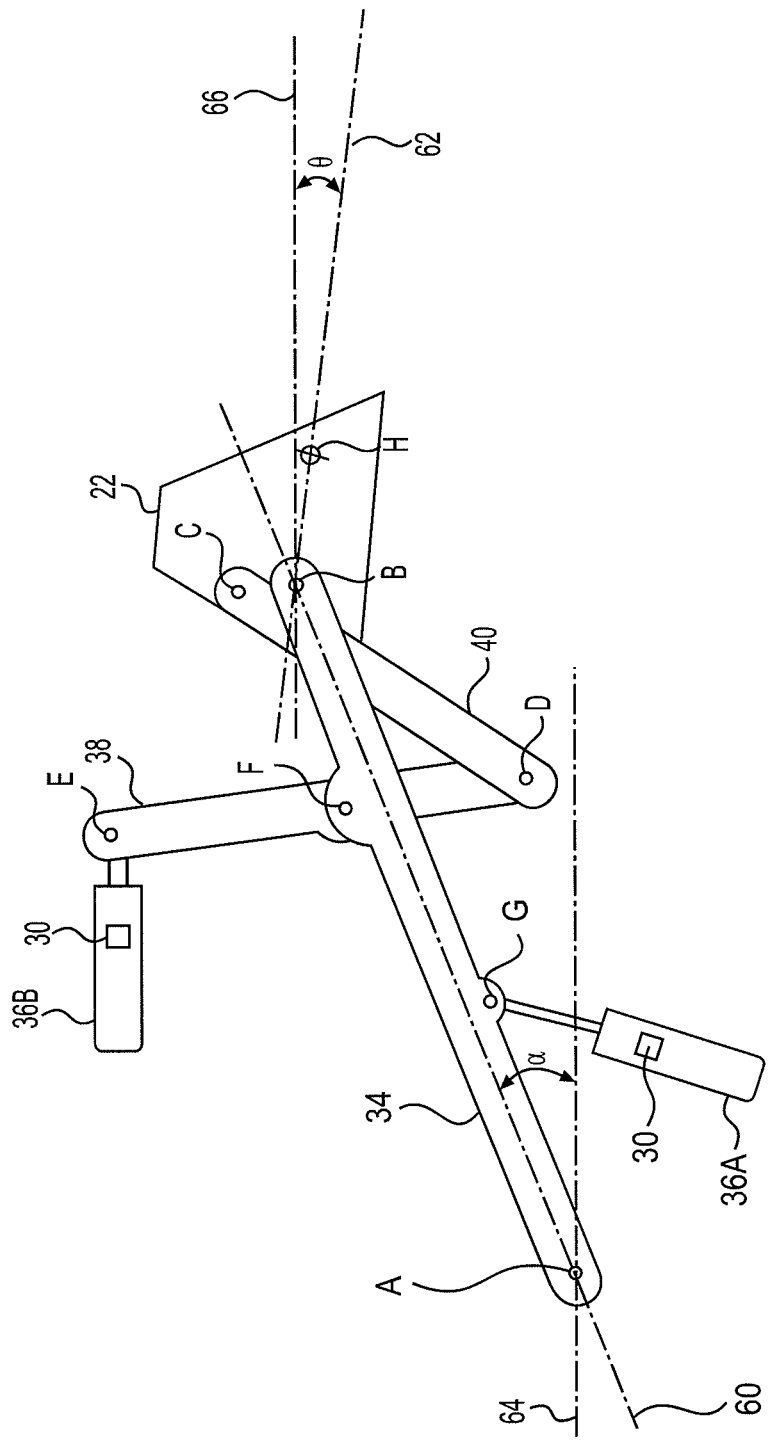
FIG. 4 is another partial schematic illustration of an implement system associated with the machine of FIG. 1.

As shown in at least FIGS. 1, 3, and 4, implement system 32 may further include a plurality of actuators 36, and at least one linkage structure acted on by actuators 36. The interaction between such linkage structures and actuators 36 may assist in moving work tool 22 relative to frame 14 and/or boom 34. Likewise, the interaction between boom 34 and actuators 36 may assist in moving boom 34 relative to frame 14. Specifically, boom 34 may be vertically pivotable relative to frame 14 by a pair of adjacent, double-acting, actuators 36a (only one shown in FIG. 1). A first end of actuator 36a may be pivotally coupled to boom 34, and a second end of actuator 36a may be pivotally coupled to frame 14.

Implement system 32 may also include a first tilt arm 38 that is pivotable relative to frame 14 and boom 34. In exemplary embodiments, first tilt arm 38 may be pinned and/or otherwise pivotally coupled to boom 34 via a pin, bushing, or other like pivot 42. First tilt arm 38 may be vertically pivotable relative to boom 34 and/or frame 14 by a single, double-acting, fluid actuator 36b. For example, a first end of tilt arm 38 may be pivotally coupled to actuator 36b and a middle portion of tilt arm 38 may be pivotally coupled to boom 34. In such embodiments, a first end of actuator 36b may be pivotally coupled to first tilt arm 38, and a second end of actuator 36b may be pivotally coupled to frame 14.

Implement system 32 may further include a second tilt arm 40 (FIGS. 3 and 4) substantially similar to first tilt arm 38. In exemplary embodiments, a first end of second tilt arm 40 may be pivotally coupled to a second end of first tilt arm 38. In such embodiments, a second end of second tilt arm 40 may be pivotally coupled to work tool 22. It is understood that couplings A-G illustrated in FIGS. 3 and 4 may represent pins, bushings, and/or other like pivotable couplings associated with boom 34, work tool 22, tilt arms 38, 40, and/or actuators 36a, 36b. For example, each of couplings A-G may include a respective pivot axis about which the associated components of implement system 32 may vertically pivot during operation of machine 10. In particular, boom 34 may include a longitudinal boom axis 60, and boom 34 may be configured to pivot, relative to a horizontal reference axis 64, about a pivot axis of coupling A. During operation and/or during various calibration routines, boom 34 (i.e., boom axis 60) may be disposed at any desired included angle α relative to reference axis 64.

Likewise, work tool 22 may include a work tool axis 62 extending substantially parallel to the base of work tool 22. In exemplary embodiments, work tool axis 62 may pass through coupling B and an exemplary reference point H of work tool 22. In such embodiments, reference point H may comprise an approximate center of gravity of work tool 22, and/or other like reference location associated with work tool 22. In such embodiments, work tool 22 may be configured to pivot, relative to a horizontal reference axis 66, about a pivot axis of coupling B. During operation and/or during various calibration routines, work tool 22 (i.e., work tool axis 62) may be disposed at any desired included angle θ relative to reference axis 66. In the embodiments illustrated in FIGS. 3 and 4, the pivot axes of couplings A-G may extend substantially horizontally, and may also extend substantially transverse to axes 60, 62, 64, 66. Further, it is contemplated that a different number and/or type of actuators, arms, couplings, and/or linkage structures may be included within implement system 32 and connected in a manner other than described above, if desired. For example, although illustrated as linear actuators in FIGS. 1-4, one or more actuators 36 of implement system 32 may be replaced with rotary actuators without departing from the scope of the present disclosure.

Tilt arms 38, 40 may be configured to determine and/or control the angular position of work tool 22 relative to boom 34 and/or frame 14. Tilt arms 38, 40 may comprise substantially rigid linkages configured to support work tool 22 when fully loaded with payload. In particular, via activation of actuator 36b, tilt arms 38, 40 may be configured to move work tool 22 between an unracked position (illustrated in FIG. 4) in which the opening and/or a front end of work tool 22 is pivoted toward the worksite surface on which machine 10 is supported, and a racked position (illustrated in FIG. 3) in which the opening and/or front end of work tool 22 is pivoted away from the worksite surface. In the unracked position, payload disposed within and/or carried by work tool 22 may be substantially removed therefrom (i.e., unloaded) through the force of gravity and/or momentum induced by movement of work tool 22 and/or boom 34. On the other hand, movement of work tool 22 toward the racked position may assist in loading work tool 22 with the payload.

Figure 2:
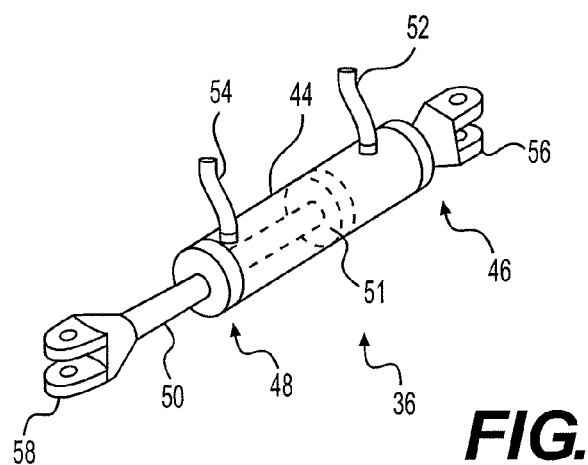
FIG. 2 is a diagrammatic illustration of an exemplary actuator associated with the machine of FIG. 1.

In the exemplary embodiments of FIGS. 1-4, and as most clearly shown in FIG. 2, an exemplary actuator 36 of the present disclosure may include a substantially cylindrical, substantially rigid housing 44 that is capped at both ends. For example, actuator 36 may include a head-end 46 that is completely capped, and a rod-end 48 opposite the head-end 46 through which an elongate rod 50 of actuator 36 may extend. In exemplary embodiments, a head-end passage 52 may be fluidly connected to the interior of housing 44 proximate head-end 46, and a substantially similar rod-end passage 54 may be fluidly connected to the interior of housing 44 proximate rod-end 48. Rod 50 may include a plunger 51 disposed within the interior of housing 44. Plunger 51 may be substantially disc-shaped and may have an outer diameter that is approximately equal to an inner diameter of the interior of housing 44. Rod 50 may also include a coupling 58 disposed opposite plunger 51, and housing 44 may include a substantially similar coupling 56 proximate head end 46. Couplings 56, 58 may be configured to accept respective pins, bushings, or other like structures, and may be configured to facilitate the various pivotal couplings described herein.

Rod 50 and plunger 51 may be moveable with respect to the interior of housing 44. For example, due to the close fit between the outer diameter of plunger 51 and the inner diameter of the interior of housing 44, a pressure differential between head-end 46 and rod-end 48 may cause rod 50 and plunger 51 to move relative to housing 44. In particular, a higher pressure at head-end 46 than rod-end 48 will force plunger 51 toward rod-end 48 of housing 44, thereby causing rod 50 to exit housing 44. As plunger 51 moves toward rod-end 48, hydraulic fluid may exit housing 44 via rod-end passage 54 and may enter housing 44 via head-end passage 52. One or more control valves (not shown) may be fluidly connected to head-end passage 52 and/or rod-end passage 54, and such valves may selectively control the passage of fluid within head-end passage 52 and/or rod-end passage 54. Likewise, a higher pressure at rod-end 48 than head-end 46 will force plunger 51 toward head-end 46 of housing 44, thereby causing rod 50 to enter housing 44. As plunger 51 moves toward head-end 46, hydraulic fluid may exit housing 44 via head-end passage 52 and may enter housing 44 via rod-end passage 54. In exemplary embodiments, housing 44 may also include one or more fluid seals disposed at rod-end 48. Such seals may be configured to assist in retaining pressurized fluid within housing 44 during movement of rod 50 into and out of housing 44.

In exemplary embodiments, information regarding the respective positions of work tool 22, boom 34, and/or tilt arms 38, 40 may be determined through the use of one or more sensors 30. Such sensors 30 may also be configured to determine information regarding the weight of the payload carried by work tool 22, the pressure within housing 44, at head-end 46 and/or rod-end 48, of the respective actuators 36a, 36b, the position of respective rods 50 and/or plungers 51 thereof, the velocity, acceleration, and/or deceleration of implement system components, and/or other like information. For example, one or more sensors 30 may be associated with any of the components of implement system 32 described herein and may comprise a proximity sensor, a Hall effect sensor, and/or other like position, proximity, or motion determination device. Such sensors 30 may be configured to determine the position of one or more such implement system components relative to frame 14 and/or relative to other respective components of implement system 32. For example, such sensors 30 may be configured to determine the angular and/or other position of work tool 22 relative to boom 34. Such sensors 30 may also be configured to determine the angular and/or other position of boom 34 relative to frame 14. In such embodiments, a magnet, flag, or other like first component of sensor 30 may be disposed on a first component of implement system 32 while a coil, detector, or other like second component of sensor 30 may be disposed on a second component of implement system 32 or on frame 14.

In additional exemplary embodiments, one or more such sensors 30 may comprise fluid pressure sensors associated with housings 44, head-end passages 52 and/or rod-end passages 54. In such embodiments, fluid pressures inside of housing 44 at head-end 46 and/or rod-end 48 may be determined from measurements of pressures associated with such components. Additionally, the fluid displacement of actuator 36 and/or the position of rod 50 and/or plunger 51 may be determined by such sensors 30. In exemplary embodiments, sensor 30 may comprise a magnetic element associated with rod 50 and/or plunger 51, and a corresponding magnet detector located on housing 44. Such a sensor configuration may be capable of determining the extension and/or retraction of rod 50 relative to housing 44. By determining the position of rod 50 and/or plunger 51 relative to housing 44, a corresponding fluid displacement of actuator 36 may be determined. Additionally, by determining head-end pressures, rod-end pressures, rod and/or plunger positions, and/or other like measurements over a given period of time, sensor 30 may assist in determining respective velocity, acceleration, and/or deceleration information related to components of implement system 32.

In further embodiments, an additional sensor 30 (not shown) may be associated with work tool 22 (e.g., mounted at an edge of work tool 22) and embody a camera. As a camera, sensor 30 may be configured to generate an image of the material being moved by work tool 22 that is representative of the material's volume. It is also contemplated that images produced by such a sensor 30 may be used to help determine the identification of constituents, if desired. For example, a particular color of the material, as captured in the image, may be related to particular constituents of the material.

In still further exemplary embodiments, another sensor 30 may be associated with work tool 22 (e.g., associated with actuator 36b used to move work tool 22) and embody a load cell. As a load cell, sensor 30 may be configured to detect a weight of the material being moved by work tool 22, following methods that are known in the art. It is contemplated that additional and/or different sensors 30 may be associated with work tool 22, if desired.

Controller 28 may embody a single or multiple microprocessors, field programmable gate arrays (FPGAs), digital signal processors (DSPs), etc., that are capable of analyzing the input from locating device 26 and sensors 30, and responsively generating a desired command, signal, calculation, determination, or other like output. Numerous commercially available microprocessors can be configured to perform the functions of controller 28. It should be appreciated that controller 28 could readily embody a microprocessor separate from that controlling other functions of machine 10 and worksite 12, or that controller 28 could be integral with a general machine and/or worksite microprocessor and be capable of controlling numerous machine and/or worksite functions and modes of operation. If a separate microprocessor, controller 28 may communicate with the general machine and/or worksite microprocessor(s) via datalinks, wireless communications, or other methods. Various other known circuits may be associated with controller 28, including power supply circuitry, signal-conditioning circuitry, actuator driver circuitry (i.e., circuitry powering solenoids, motors, or piezo actuators), and communication circuitry.

Measurements, signals, determinations, and/or other information generated by locating device 26 and sensors 30 may be directed to controller 28. Such information may be stored in a memory of controller 28 and selectively displayed on interface device 24. The memory of controller 28 may store such information in the form of tables, graphs, and/or equations. Controller 28 may be configured to automatically generate any of the outputs described herein, in real time, during operation of machine 10. As will be described in more detail in the following section, controller 28 may also be configured to run one or more calibration routines associated with work tool 22 and/or other components of implement system 32. Controller 28 may also be configured to allow the operator of machine 10 to control operation of machine 10 and/or to select machine operating parameters from available parameters stored in the memory of controller 28. It is contemplated that such machine operation and/or selection of machine operating parameters may additionally or alternatively be automatically implemented and/or selected by controller 28 based on modes of machine operation, if desired.

In one embodiment, controller 28 may be located onboard machine 10. In this embodiment, controller 28 may receive direct input from locating device 26 and sensors 30 also located onboard machine 10. It is contemplated that, in this embodiment, controller 28 may also be configured to communicate information obtained from locating device 26 and sensors 30, and/or associated with the calibration and/or other analysis performed by controller 28, offboard machine 10 to, for example, a worksite base station (not shown) or a general worksite controller (not shown) located at worksite base station. This information may then be analyzed at the worksite base station and/or forwarded to other machines 10 operating at worksite 12.

In another embodiment, controller 28 could be the general worksite controller located at the worksite base station described above. That is, it may be possible that the information obtained from locating device 26 and sensors 30 is analyzed at the worksite base station. In this situation, the worksite base station could then communicate location, calibration, and/or other information machine 10 and/or other machines operating at worksite 12. It may also be possible for controller 28 to then allocate resources of worksite 12 based on information obtained from locating device 26 and sensors 30 to improve profitability of worksite 12. For example, controller 28 may be capable of assigning tasks to one or more machines 10 at worksite 12, and/or to facilitate calibration scheduling of such machines 10, based on such information. Such information may also be stored, analyzed, and/or used by controller 28 to improve the accuracy of future worksite machine calibrations.

In addition, controller 28 may cause other information related to worksite 12, machine 10, a calibration routine being performed by controller 28, and/or other machines 10 operating at worksite 12 to be displayed on interface device 24. For example, controller 28 could be configured to determine a weight of the payload carried by work tool 22, a volume of the payload, a density of the payload, a commodity price of constituents of the payload, a value of the payload, and other related information, and may cause this information to be displayed on interface device 24, if desired.

INDUSTRIAL APPLICABILITY

The disclosed embodiments may be applicable to any worksite 12 and usable with any material handling machine 10 to determine a weight of a payload carried by work tool 22. For example, exemplary embodiments of the present disclosure may be utilized to assist in calibrating a weight determination system and/or algorithm of such machines 10. The embodiments of the present disclosure may be employed in worksites 12 in which there is no scale or other weighing device readily available for use in weight determination system calibration. The embodiments of the present disclosure may also be employed in worksites 12 in which a known weight suitable for use in weight determination system calibration is not available. Instead, for calibration purposes, the exemplary embodiments of the present disclosure may be configured to determine the weight a payload carried by work tool 22 based on, among other things, actuator pressures, the pitch angle of machine 10, and/or other characteristics of implement system 32.

It is understood that a payload weight determination system associated with machine 10 may require calibration before using machine 10 at worksite 12 and/or at periodic maintenance intervals. The exemplary systems, components, and/or methods described herein may be used to calibrate such an exemplary payload weight determination system. Alternatively and/or in addition, the exemplary embodiments of the present disclosure may comprise a portion or subset of a general payload weight determination system calibration routine associated with machine 10. An exemplary method of payload weight determination useful in such system calibrations will now be described in detail with respect to the flow chart 100 of FIG. 5.

An exemplary calibration and/or payload weight determination routine may begin at Step: 110. At Step: 110, an operator of machine 10 may initiate such a routine by manipulating one or more interface devices 24 and/or otherwise directing an initiation command to controller 28. As part of initiating the calibration routine, operator and/or controller 28 may pivot work tool 22 to a fully unracked position to thereby substantially empty work tool 22 of any material or payload disposed therein and/or carried thereby. It is understood that each of the steps illustrated in FIG. 5 may be performed manually by the operator, semi-automatically by controller 28 with input from the operator, and/or fully automatically by controller 28 without input from the operator. For ease of description, the exemplary steps illustrated in FIG. 5 will be described as being automatically performed by controller 28 for the duration of this disclosure unless otherwise specified.

At Step: 110, controller 28 may also set a rotational speed of engine 18 to a desired substantially constant calibration speed useful for controllably raising and lowering boom 34 through an entire range of motion thereof while work tool 22 is fully loaded with a payload. Such an engine speed may be chosen to ensure ample torque is available for operation of actuators 36a, 36b without lugging or stalling engine 18. For example, such a desired engine speed may be any speed between a low idle speed of engine 18 and a high idle speed of engine 18, and in exemplary embodiments, such a desired engine speed may yield approximately a peak engine output torque. Depending on the size and configuration of engine 18, such a desired engine speed may be between approximately 1300 rpm and approximately 1600 rpm.

At Step: 110, controller 28 may also command actuator 36b to tilt work tool 22 to a fully-racked position, and may command actuator 36a to lower boom 34 to a fully-lowered position. In an exemplary fully-racked position, angle θ between work tool axis 62 and reference axis 66 may be maximized, and rod 50 may be fully extended from actuator 36b. Accordingly, at the fully-racked position, angle θ may comprise a maximum tilt angle of work tool 22. Likewise, in an exemplary fully-lowered position, angle α between boom axis 60 and reference axis 64 may be minimized (i.e., may be a negative angle relative to reference axis 64), and rod 50 may be fully withdrawn within actuator 36a. Accordingly, at the fully-lowered position, angle α may comprise a minimum lift angle of boom 34.

Additionally, at Step: 110 locating device 26 may measure and/or otherwise determine a pitch angle of machine 10. As noted above, the pitch angle of machine 10 may be an angle of incline (i.e., a positive angle) or decline (i.e., a negative angle), and at Step: 110, the pitch angle may be determined relative to at least one of horizontal reference axes 64, 66. It is understood that such a pitch angle may change during the exemplary method illustrated by FIG. 5. For example, the pitch angle may decrease, relative to the pitch angle initially measured at Step: 110, when a substantially empty work tool 22 is loaded with a payload. Likewise, the pitch angle may increase, relative to a pitch angle determined with a loaded work tool 22, when the work tool 22 is substantially emptied. Accordingly, the pitch angle may be measured, monitored, and/or otherwise determined at multiple times throughout the exemplary method illustrated by FIG. 5.

Control may then proceed to Step: 112 where controller 28 may command actuator 36a to raise boom 34 from the fully-lowered position at the minimum lift angle described above to a position at a target lift angle. Once actuator 36a positions boom 34 as commanded, sensors 30 may determine the actual position of boom 34 relative to, for example, frame 14, and may store such an actual position in the memory of controller 28. Alternatively or in addition, sensors 30 may determine the actual position of rod 50 relative to housing 44 of actuator 36a and may store such an actual position.

Figure 5:
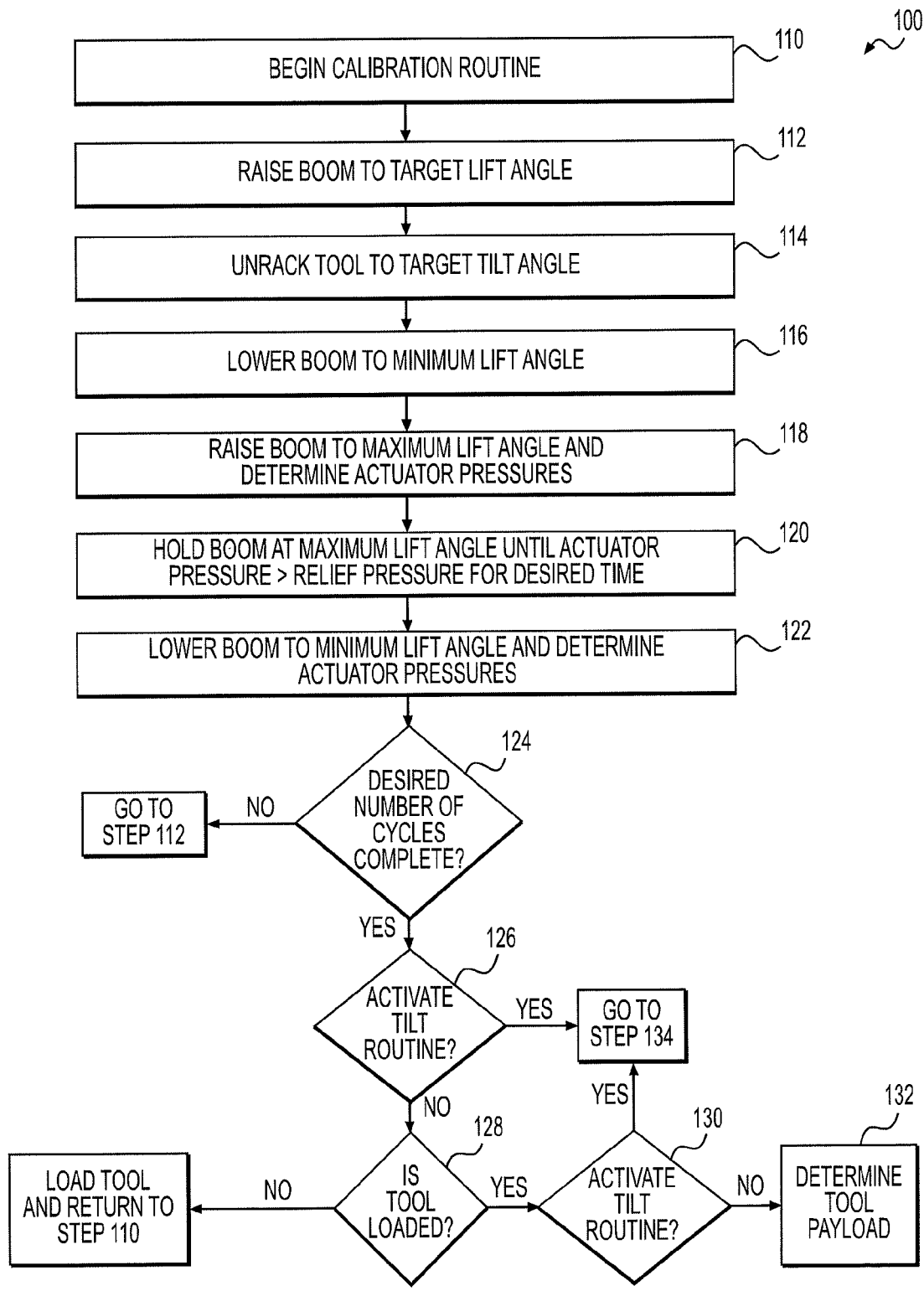
FIG. 5 is a flow chart illustrating an exemplary method associated with the machine of FIG. 1.
Figure 5:
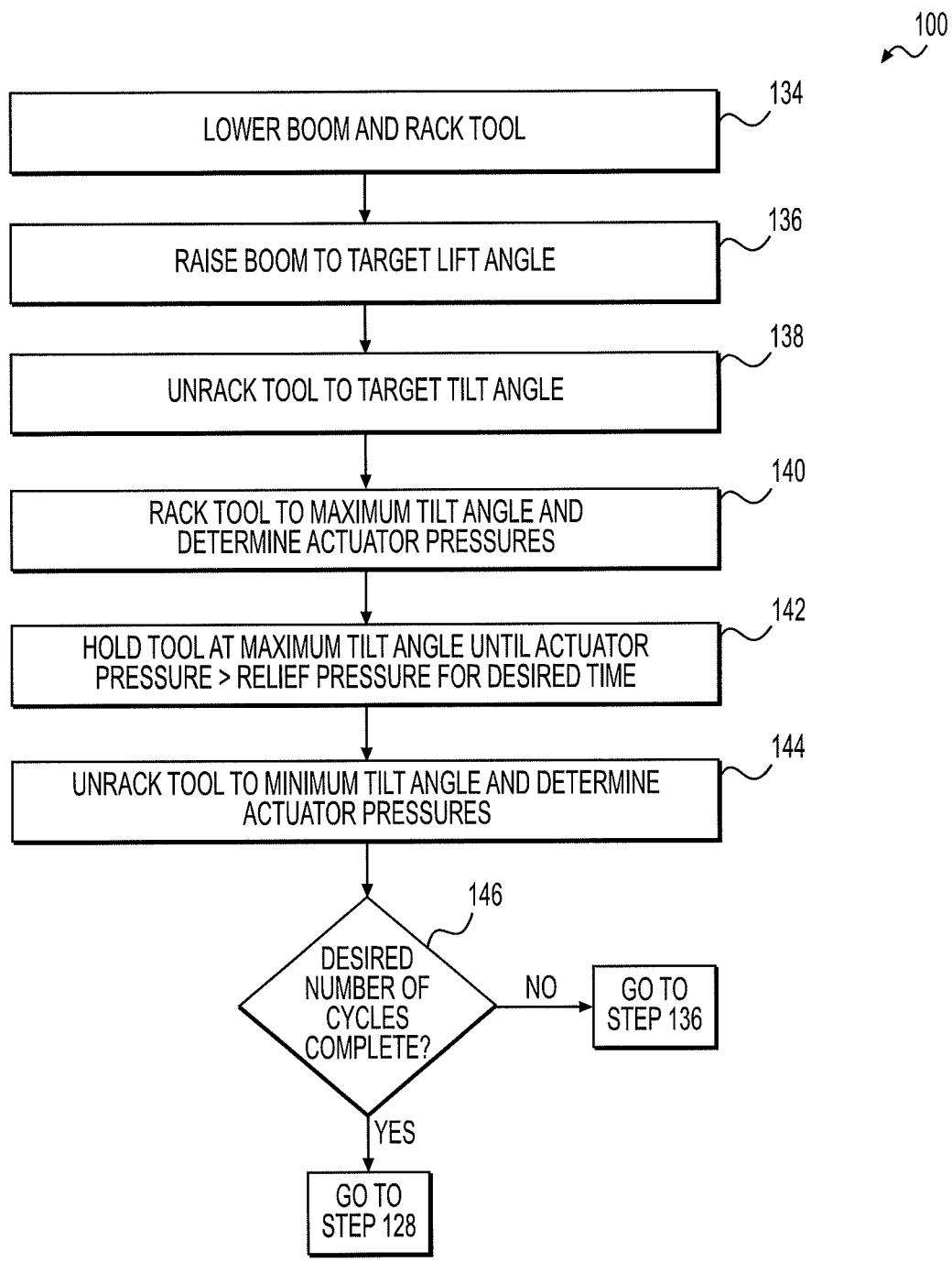

In exemplary embodiments, the target lift angle of boom 34 may be any angle α within the range of movement of boom 34, between boom axis 60 and reference axis 64, that is convenient for calibration purposes and that may be returned to throughout the exemplary method illustrated by FIG. 5 for comparison, measurement, and/or calibration. For example, at various steps of an exemplary payload weight determination method, controller 28 may command actuator 36a to raise or lower boom 34 to the position corresponding to the target lift angle. Upon activation of actuator 36a to dispose boom 34 at such a position, controller 28 may determine the actual position of boom 34 based on inputs received from sensors 30. By repeating this step at various times during the exemplary method illustrated by FIG. 5, and by comparing the changes in the actual position of boom 34, the accuracy of the calibration process may be improved.

Further, in such embodiments, the target lift angle may comprise a predetermined and/or otherwise selected absolute reference lift angle, as modified by the pitch angle determined by locating device 26. For example, at various steps in the exemplary method illustrated by FIG. 5, controller 28 may command actuator 36a to raise or lower boom 34 to a position corresponding to a target lift angle. In order to determine the appropriate target lift angle associated with such a command, controller 28 may add or subtract the determined pitch angle from the selected absolute reference lift angle. For example, if the reference lift angle comprises a positive 15 degree angle α relative to horizontal reference axis 64, and the determined pitch angle is a negative 2 degrees relative to horizontal reference axis 64 (i.e. machine 10 is positioned on grade having a 2 degree declined slope), the determined target lift angle may be a positive 17 degree angle α relative to horizontal reference axis 64. Thus, the target lift angle may comprise a desired angle α, that is based on an absolute reference lift angle, and that is corrected and/or modified to account for machine pitch.

Control may then proceed to Step: 114 where controller 28 may command actuator 36b to tilt work tool 22 from the fully-racked position at the maximum tilt angle described above to a position at a target tilt angle. Once actuator 36b positions work tool 22 as commanded, sensors 30 may determine the actual position of work tool 22 relative to, for example, frame 14 and/or boom 34, and may store such an actual position in the memory of controller 28. Alternatively or in addition, sensors 30 may determine the actual position of rod 50 relative to housing 44 of actuator 36b and may store such an actual position.

The target tilt angle may be determined in the same way as the target lift angle described above. For example, the target tilt angle of work tool 22 may be any angle θ within the range of movement of work tool 22, between work tool axis 62 and reference axis 66, that is convenient for calibration purposes and that may be returned to throughout the exemplary method illustrated by FIG. 5 for comparison, measurement, and/or calibration. For example, at various steps of an exemplary payload weight determination method, controller 28 may command actuator 36b to rack or unrack work tool 22 to the position corresponding to the target tilt angle. Upon activation of actuator 36b to dispose work tool 22 at such a position, controller 28 may determine the actual position of work tool 22 based on inputs received from sensors 30. By repeating this step at various times during the exemplary method illustrated by FIG. 5, and by comparing the changes in the actual position of work tool 22, the accuracy of the calibration process may be improved.

Further, in such embodiments, the target tilt angle may comprise a predetermined and/or otherwise selected absolute reference tilt angle, as modified by the pitch angle determined by locating device 26. For example, at various steps in the exemplary method illustrated by FIG. 5, controller 28 may command actuator 36b to rack or unrack work tool 22 to a position corresponding to a target tilt angle. In order to determine the appropriate target tilt angle associated with such a command, controller 28 may add or subtract the determined pitch angle from the selected absolute reference tilt angle. For example, if the reference tilt angle comprises a positive 20 degree angle θ relative to horizontal reference axis 66, and the determined pitch angle is a negative 2 degrees relative to horizontal reference axis 66 (i.e. machine 10 is positioned on grade having a 2 degree declined slope), the determined target tilt angle may be a positive 22 degree angle θ relative to horizontal reference axis 66. Thus, the target tilt angle may comprise a desired angle θ, that is based on an absolute reference tilt angle, and that is corrected and/or modified to account for machine pitch.

Control may then proceed to Step: 116 where controller 28 may command actuator 36a to lower boom 34 to the fully-lowered position at the minimum lift angle described above. Once actuator 36a positions boom 34 as commanded at Step: 116, sensors 30 may again determine the actual position of boom 34 relative to, for example, frame 14, and may store such an actual position in the memory of controller 28. Alternatively or in addition, sensors 30 may determine the actual position of rod 50 relative to housing 44 of actuator 36a and may store such an actual position. It is understood that any of the position, pressure, and/or other determinations made and stored at Steps: 110-116 may be utilized at later steps in the exemplary method illustrated by FIG. 5. Additionally, the boom 34 and work tool 22 movements performed during Steps: 110-116 may assist in minimizing and/or substantially eliminating friction associated with the various rods 50, pins, plungers 51, couplings 56, 58, and/or other components of actuators 36a, 36b. The movements performed during Steps: 110-116 may also assist in minimizing and/or substantially eliminating seal resistance, back pressure, and/or other external forces associated with housings 44 and/or other components of implement system 32. Accordingly, such movements may improve the accuracy of the various pressure, position, payload weight, and/or other determinations made during later steps of the exemplary method illustrated by FIG. 5.

At Step: 118, controller 28 may command actuator 36a to raise boom 34 to a fully-raised position of boom 34. In an exemplary fully-raised position of boom 34, angle α between boom axis 60 and horizontal reference axis 64 may be maximized (i.e., may be a positive angle relative to reference axis 64), and rod 50 may be fully extended from actuator 36a. Accordingly, at the fully-raised position, angle α may comprise a maximum lift angle of boom 34. During Step: 118, and as boom 34 is raised across the position described above at the absolute reference lift angle, one or more fluid pressures, positions, and/or other metrics associated with actuator 36a and/or boom 34 may be determined by sensors 30. Such metrics may be stored within the memory of controller 28 for later use. For example, as boom 34 is raised across the position described above at the absolute reference lift angle, respective head-end and rod-end pressures of actuators 36a and 36b may be determined by sensors 30. In such embodiments, the respective head-end and rod-end pressures of actuators 36a and 36b may be determined as boom 34 is disposed at the absolute reference lift angle.

In further exemplary embodiments, such respective head-end and rod-end pressures of actuators 36a and 36b may be determined as boom 34 is disposed at one or more additional positions. Such additional positions of boom 34 may be positions proximate the position described above at the absolute reference lift angle. Accordingly, in such embodiments, a plurality of additional respective head-end and rod-end pressures of actuators 36a and 36b may be determined at various lift angles proximate the absolute reference lift angle. Such pressures may be determined at, for example, one, two, or three degree increments (positive and/or negative) relative to and/or centered about the absolute reference lift angle. The determination of such additional pressures may increase the accuracy of the payload determination and/or other determinations made during later steps of the exemplary method illustrated by FIG. 5. For example, if the center of gravity of work tool 22 and/or the payload carried by work tool 22 shifts during Step: 118, the determination of multiple respective head-end and rod-end pressures may assist in compensating for such a shift and/or other unexpected movements associated with machine 10.

Control may then proceed to Step: 120 where the controller 28 may command actuator 36a to hold and/or otherwise maintain boom 34 at the fully-raised position associated with the maximum lift angle until one of a head-end pressure and a rod-end pressure of actuator 36a is greater than a predetermined relief pressure for a desired time. In such embodiments, the predetermined relief pressure may be a fluid relief pressure associated with actuator 36a, at least one of passages 52, 54, and/or the one or more control valves or other fluid components associated with actuator 36a. In exemplary embodiments, such a relief pressure may comprise a maximum pressure associated with such components. For example, as rod 50 is fully-extended from housing 44 of actuator 36a, one or more control valves fluidly connected to actuator 36a may be forced to open, thereby permitting pressurized fluid to be released to a low-pressure fluid supply on machine 10. In such embodiments, holding and/or otherwise maintaining boom 34 at the fully-raised position associated with the maximum lift angle until one of the head-end pressure and the rod-end pressure of actuator 36a is greater than such a predetermined relief pressure for a desired time may ensure that a maximum hydraulic pressure is being delivered to actuator 36a, and may assist in improving the accuracy of the various pressure, position, payload weight, and/or other determinations made during later steps of the exemplary method illustrated by FIG. 5. In exemplary embodiments, such a desired time may be between approximately one second and approximately ten seconds.

Control may then proceed to Step: 122 where controller 28 may command actuator 36a to lower boom 34 to the fully-lowered position associated with the minimum lift angle α described above. Similar to the processes described with respect to Step: 118, as boom 34 is lowered across the position at the absolute reference lift angle, one or more fluid pressures, positions, and/or other metrics associated with actuator 36a and/or boom 34 may be determined by sensors 30. Such metrics may be stored within the memory of controller 28 for later use. For example, as boom 34 is lowered across the position at the absolute reference lift angle during Step: 122, respective head-end and rod-end pressures of actuators 36a and 36b may be determined by sensors 30. In such embodiments, the respective head-end and rod-end pressures of actuators 36a and 36b may be determined as boom 34 is disposed at the absolute reference lift angle.

In further exemplary embodiments, such respective head-end and rod-end pressures of actuators 36a and 36b may be determined during Step: 122 as boom 34 is disposed at one or more additional positions. Such additional positions of boom 34 may be positions proximate the position described above at the absolute reference lift angle. Accordingly, in exemplary embodiments of Step: 122, a plurality of additional respective head-end and rod-end pressures of actuators 36a and 36b may be determined, at various lift angles proximate the absolute reference lift angle, as boom 34 is lowered.

Steps: 112-122 may be repeated for any desired number of cycles, and repeating Steps: 112-122 may improve the accuracy of the various pressure, position, payload weight, and/or other determinations made during later steps of the exemplary method illustrated by FIG. 5. In exemplary embodiments, Steps: 112-122 may be repeated at least twice for a desired level of measurement accuracy while work tool 22 is in the unloaded state. Accordingly, at Step: 124, controller 28 may determine whether a desired number of cycles have been completed. If a desired number of "unloaded" cycles have not yet been completed (Step: 124—No), control may continue to Step: 112. If, however, a desired number of unloaded cycles have been completed (Step: 124—Yes), control may proceed to Step: 126 where operator and/or controller 28 may determine whether to activate an optional tilt routine configured to further increase the accuracy of the ultimate payload weight determination made by the exemplary method illustrated in FIG. 5. If operator and/or controller 28 do not activate the tilt routine (Step: 126—No), control may proceed to Step: 128 where controller 28 may determine whether the work tool 22 is loaded with a payload. If work tool 22 is not carrying a payload (Step: 128—No), operator may load work tool 22 with a payload accessible at worksite 12 and control may proceed to Step: 110 for operation of a desired number of "loaded" cycles.

If, on the other hand, work tool 22 is carrying a payload (Step: 128—Yes), control may proceed to Step: 130 where operator and/or controller 28 may again determine whether to activate the optional tilt routine described above with respect to Step: 126. It is understood that the optional tilt routine may be activated before or after loading work tool 22 with a payload. In exemplary embodiments, if the tilt routine is activated at Step: 126 prior to loading work tool 22, controller 28 may automatically repeat the tilt routine after work tool 22 has been loaded. If operator and/or controller 28 do not activate the tilt routine (Step: 130—No), control may proceed to Step: 132 where controller 28 may determine the weight of the payload carried by work tool 22.

If operator and/or controller 28 activate tilt routine at either Step: 126 or Step: 130 (Step: 126—Yes; Step: 130—Yes), control may proceed to Step: 134 where, similar to Step: 110 described above, controller 28 may command actuator 36b to tilt work tool 22 to the fully-racked position associated with the maximum tilt angle θ. At Step: 134, controller 28 may also command actuator 36a to lower boom 34 to the fully-lowered position associated with minimum lift angle α.

Control may then proceed to Step: 136 where, similar to Step: 112, controller 28 may command actuator 36a to raise boom 34 from the fully-lowered position at the minimum lift angle to a position at the target lift angle. Once actuator 36a positions boom 34 as commanded at Step: 136, sensors 30 may determine the actual position of boom 34 relative to, for example, frame 14, and may store such an actual position in the memory of controller 28 for later use. Alternatively or in addition, at Step: 136 sensors 30 may determine the actual position of rod 50 relative to housing 44 of actuator 36a and may store such an actual position. At this time, sensors 30 may also determine and store head-end and/or rod-end pressures associated with actuators 36a, 36b.

At Step: 138, controller 28 may command actuator 36b to unrack work tool 22 in a manner similar to that described above with respect to Step: 114. For example, at Step: 138 controller 28 may command actuator 36b to tilt work tool 22 from the fully-racked position at the maximum tilt angle described above to a position at the target tilt angle. Once actuator 36b positions work tool 22 as commanded at Step: 138, sensors 30 may determine the actual position of work tool 22 relative to, for example, frame 14 and/or boom 34, and may store such an actual position in the memory of controller 28. Alternatively or in addition, sensors 30 may determine the actual position of rod 50 relative to housing 44 of actuator 36b and may store such an actual position. At this time, sensors 30 may also determine and store head-end and/or rod-end pressures associated with actuators 36a, 36b.

Control may then proceed to Step: 140 where controller 28 may command actuator 36b to rack work tool 22 to the fully-racked position associated with the maximum tilt angle described above. Similar to the pressure determination process described above with respect to Step: 118, as work tool 22 is tilted (i.e., racked) across a position at an absolute reference tilt angle during Step: 140, one or more fluid pressures, positions, and/or other metrics associated with actuators 36a, 36b, boom 34, and/or work tool 22 may be determined by sensors 30. The reference tilt angle noted at Step: 140 may be analogous to the reference lift angle described above with respect to Step: 118. The values determined at Step: 140 may be stored within the memory of controller 28 for later use. For example, as work tool 22 is tilted across the position described above at the absolute reference tilt angle, respective head-end and rod-end pressures of actuators 36a and 36b may be determined by sensors 30. In such embodiments, the respective head-end and rod-end pressures of actuators 36a and 36b may be determined as work tool 22 is disposed at the absolute reference tilt angle.

Control may then proceed to Step: 142 where, in a process similar to that described above with respect to Step: 120, controller 28 may command actuator 36b to hold and/or otherwise maintain work tool 22 at the fully-racked position associated with the maximum tilt angle until one of a head-end pressure and a rod-end pressure of actuator 36b is greater than a predetermined relief pressure for a desired time. In such embodiments, the predetermined relief pressure may be a fluid relief pressure associated with actuator 36b, at least one of respective passages 52, 54, and/or the one or more control valves or other fluid components associated with actuator 36b. In exemplary embodiments, such a relief pressure may comprise a maximum pressure associated with such components. For example, as rod 50 is fully-extended from housing 44 of actuator 36b, one or more control valves fluidly connected to actuator 36b may be forced to open, thereby permitting excess fluid to be released to a low-pressure fluid supply on machine 10. The relief pressure noted at Step: 142 may comprise a pressure at which such a control valve may be forced to open.

Control may then proceed to Step: 144 where controller 28 may command actuator 36b to unrack work tool 22 to the fully-unracked position associated with the minimum tilt angle described above. As work tool 22 is tilted (i.e., unracked) across the position at the absolute reference tilt angle (associated with the target tilt angle) during Step: 144, one or more fluid pressures, positions, and/or other metrics associated with actuators 36a, 36b, boom 34, and/or work tool 22 may be determined by sensors 30. The reference tilt angle noted at Step: 144 may be the same as (i.e., equal to) the reference tilt angle described above with respect to Step: 140. Such metrics may be stored within the memory of controller 28 during Step: 144 for later use. For example, as work tool 22 is unracked across the position described above at the absolute reference tilt angle, respective head-end and rod-end pressures of actuators 36a and 36b may be determined by sensors 30. In such embodiments, the respective head-end and rod-end pressures of actuators 36a and 36b may be determined as work tool 22 is disposed at the absolute reference tilt angle.

At Step: 146, controller 28 and/or operator may determine whether a desired number of cycles of the tilt routine have been completed. If controller 28 and/or operator determine that the desired number of tilt routine cycles have not been completed (Step: 146—No), control may return to Step: 136. If, on the other hand, controller 28 and/or operator determine that the desired number of tilt routine cycles have been completed (Step: 146—Yes), control may proceed to Step: 128. The exemplary method set forth in FIG. 5 may continue in this manner until control proceeds to Step: 132.

At Step: 132, controller 28 may determine the weight of the payload carried by work tool 22 based on one or more of the pressures, positions, angles, and/or other metrics described above with respect to at least Steps: 110-122. Additionally, in embodiments in which the tilt routine is activated at Steps: 126 or 130, one or more of the pressures, positions, angles, and/or other metrics determined during Steps: 134-144 may also be used to determine the weight of the payload at Step: 132. In exemplary embodiments, the payload weight determined at Step: 132 may be based on one or more of the respective head-end and rod-end pressures of actuators 36a, 36b, as determined during the loaded and/or unloaded cycle conditions described above. The payload weight determined at Step: 132 may also be based on the pitch angle described above with respect to Step: 110, as determined during the loaded and/or unloaded cycle conditions. For example, at Step: 132 such respective head-end and rod-end pressures of actuators 36a, 36b, as well as the pitch angle, may be used by controller 28 as inputs to one or more payload weight determination look-up tables, algorithms, maps, and/or other like software or hardware components. The payload weight determined at Step: 132 may comprise an output of such look-up tables, algorithms, maps, and/or other components.

In exemplary embodiments, the payload weight determined at Step: 132 may be used by controller 28 as an input in, for example, a broader machine calibration and/or control algorithm. For example, the payload weight determined at Step: 132 may comprise a "loaded" payload weight input utilized in such a calibration algorithm. Whereas such "loaded" payload weight inputs may typically be generated utilizing scales and/or payloads of known weights disposed at worksite 12, embodiments of the present disclosure may be configured to determine such a loaded payload weight without the use of such scales or known weights. Further, it is understood that repeatedly determining the various pressures, positions, and/or other metrics described herein when boom 34 and/or work tool 22 are disposed at their respective reference lift and tilt angles (see, for example, Steps: 118, 122, 140, and 144), may assist in improving the accuracy of the payload weight determination made at Step: 132.

It will be apparent to those skilled in the art that various modifications and variations can be made to the exemplary embodiments disclosed herein. For example, in further exemplary embodiments, the payload weight may be determined at Step: 132 based on one or more lengths, widths, weights, and/or other characteristics of at least one of boom 34, tilt arms 38, 40, actuators 36a, 36b, and work tool 22. In still further embodiments, the payload weight may be determined at Step: 132 based on one or more velocities, accelerations, decelerations, moments, and/or other kinematic characteristics of at least one of boom 34, tilt arms 38, 40, actuators 36a, 36b, and work tool 22.

In still further embodiments of the present disclosure, forces associated with actuator 36b may be determined, at various work tool and/or boom positions. Such determined forces may be used to estimate, for example, friction forces associated with one or more seals of housing 44, rod 50, plunger 51, and/or other components of implement system 32. Such forces may be estimated as a percentage of friction forces experienced while work tool 22 is disposed at a stationary location associated with the target tilt angle described above, and such force determinations may be measured during the optional tilt routine discussed above with respect to Steps: 134-146. As part of such an exemplary process, head and/or rod-end pressures, positions, displacements, and/or other forces associated with actuator 36b may be determined during the tilt routine while work tool 22 is held stationary at the target tilt angle. Such forces may also be determined while work tool 22 is raised and/or lowered across the target tilt angle. Such determinations may be made while the work tool 22 is in both an empty and a loaded condition. Once such measurements and/or determinations have been made, controller 28 may determine a friction force associated with actuator 36b using any known friction force algorithm. For example, friction force ("FF") may be equal to one half of the difference between the force measured while work tool 22 is racked across the target tilt angle and the force measured while work tool 22 is unracked across the target tilt angle. Correspondingly, friction force as a percentage of the forces experienced by actuator 36b with work tool 22 disposed stationary at the target tilt angle may be calculated by dividing the above friction force FF by the force determined with work tool 22 held stationary at the target tilt angle. Based on these known relationships, the force exerted by and/or other forces associated with actuator 36b may be estimated, without the effects of friction, at any desired lift angle in which work tool 22 is disposed at the target tilt angle.

In still further embodiments, and in accordance with the relationships described above, a similar process may be employed with respect to actuator 36a. For example, forces associated with actuator 36a may be measured at various lift angles in addition to the target lift angle, while work tool 22 is disposed at the target tilt angle. In such a process, the tilt routine may be repeated at these additional lift angles, and the above process/relationships may be used to approximate forces associated with actuator 36a at such additional lift angles.

In still further embodiments, the above process may be used to approximate forces associated with actuator 36b at two target tilt angles/positions. For example, by measuring pressures, positions, and/or forces associated with actuator 36b, and running the lift routine with two target tilt angles, the above process may be used to approximate forces associated with actuator 36b at the two target tilt angles while boom 34 is disposed at lift angles other than the target lift angle.

Other embodiments will be apparent to those skilled in the art from consideration of the specification and practice of the disclosed embodiments. It is intended that the specification and examples be considered as exemplary only, with a true scope of the present disclosure being indicated by the following claims and their equivalents.

What is claimed is:

1. A payload determination method associated with a machine, comprising:
   a) raising a boom of the machine from a first position at a minimum lift angle of the boom to a second position at a maximum lift angle of the boom;
   b) determining first head-end and first rod-end pressures of a first actuator operably connected to the boom as the boom is raised across a third position at a reference lift angle of the boom between the minimum and maximum lift angles;
   c) determining first head-end and first rod-end pressures of a second actuator operably connected to a work tool of the machine as the boom is raised across the third position;
   d) lowering the boom from the second position to the first position;
   e) determining second head-end and second rod-end pressures of the first actuator as the boom is lowered across the third position;
   f) determining second head-end and second rod-end pressures of the second actuator as the boom is lowered across the third position; and g) determining a weight of a payload carried by the work tool based on the first and second head-end pressures of the first actuator, the first and second rod-end pressures of the first actuator, the first and second head-end pressures of the second actuator, the first and second rod-end pressures of the second actuator, and a determined pitch angle of the machine, wherein the payload is carried by the work tool during at least steps b, c, e, and f.

2. The method of claim 1, further including emptying the work tool, setting an engine of the machine to a desired engine speed, and tilting the work tool to a position at a maximum tilt angle of the work tool prior to step a.

3. The method of claim 2, further including lowering the boom to the first position prior to step a.

4. The method of claim 1, wherein the reference angle comprises a target angle associated with the boom and modified based on the pitch angle.

5. The method of claim 4, further including raising the boom to a position at the target angle and lowering the boom to the first position prior to step a.

6. The method of claim 1, further including tilting the work tool to a position at a minimum tilt angle of the work tool prior to step a.

7. The method of claim 1, further including holding the boom at the second position until one of a third head-end pressure and a third rod-end pressure of the first actuator is greater than a predetermined relief pressure for a desired time.

8. The method of claim 1, further including determining third head-end and third rod-end pressures of the first actuator as the boom is raised proximate the third position,
determining third head-end and third rod-end pressures of the second actuator as the boom is raised proximate the third position, and
determining the weight of the payload based on the third head-end and third rod-end pressures of the first actuator, and the third head-end and third rod-end pressures of the second actuator.

9. The method of claim 1, further including determining third head-end and third rod-end pressures of the first actuator as the boom is lowered proximate the third position,
determining third head-end and third rod-end pressures of the second actuator as the boom is lowered proximate the third position, and
determining the weight of the payload based on the third head-end and third rod-end pressures of the first actuator, and the third head-end and third rod-end pressures of the second actuator.

10. The method of claim 1, further including performing steps a-f when the work tool is substantially unloaded and repeating steps a-f when the payload is carried by the work tool.

11. The method of claim 1, further including:
h) racking the work tool from a fourth position at a minimum tilt angle of the work tool to a fifth position at a maximum tilt angle of the work tool;
i) determining third head-end and third rod-end pressures of the first actuator as the work tool is racked across a sixth position at a reference tilt angle of the work tool between the minimum and maximum tilt angles;
j) determining third head-end and third rod-end pressures of the second actuator as the work tool is racked across the sixth position;
k) unracking the work tool from the fifth position to the fourth position;
l) determining fourth head-end and fourth rod-end pressures of the first actuator as the work tool is unracked across the sixth position;
m) determining fourth head-end and fourth rod-end pressures of the second actuator as the work tool is unracked across the sixth position; and
n) determining the weight of the payload based on the third and fourth head-end pressures of the first actuator, the third and fourth rod-end pressures of the first actuator, the third and fourth head-end pressures of the second actuator, and the third and fourth rod-end pressures of the second actuator.

12. The method of claim 11, wherein the payload is carried by the work tool during at least steps i, j, l, and m.

13. The method of claim 11, further including performing steps h-m when the work tool is substantially unloaded and repeating steps h-m when the payload is carried by the work tool.

14. The method of claim 11, further including holding the work tool at the fifth position until one of a fifth head-end pressure and a fifth rod-end pressure of the second actuator is greater than a predetermined relief pressure for a desired time.

15. The method of claim 11, wherein the reference tilt angle comprises a target tilt angle associated with the work tool and modified based on the pitch angle.

16. The method of claim 15, further including unracking the work tool to a seventh position at the target tilt angle prior to step h.

17. The method of claim 16, further including lowering the boom to the first position, and racking the work tool to the fifth position, prior to step h.

18. A payload determination method associated with a machine, comprising:
a) lowering a boom of the machine to a first position at a minimum lift angle of the boom, unracking a bucket of the machine connected to the boom, and racking the bucket;
b) raising the boom from the first position to a second position at a maximum lift angle of the boom;
c) determining first head-end and first rod-end pressures of a first hydraulic cylinder operably connected to the boom as the boom is raised across a third position at a reference lift angle of the boom between the minimum and maximum lift angles, wherein the reference lift angle comprises a target lift angle modified by a determined pitch angle of the machine;
d) determining first head-end and first rod-end pressures of a second hydraulic cylinder operably connected to the bucket as the boom is raised across the third position;
e) lowering the boom from the second position to the first position;
f) determining second head-end and second rod-end pressures of the first hydraulic cylinder as the boom is lowered across the third position;
g) determining second head-end and second rod-end pressures of the second hydraulic cylinder as the boom is lowered across the third position;
h) disposing a payload within the bucket and repeating steps b-g while the bucket is loaded with the payload; and
i) determining a weight of the payload, wherein the determined weight is based on each of the hydraulic cylinder pressures determined with the bucket substantially empty, each of the hydraulic cylinder pressures determined with the bucket loaded with the payload, and the determined pitch angle of the machine.

19. The method of claim 18, further including holding the boom at the second position until one of a third head-end pressure and a third rod-end pressure of the first hydraulic cylinder is greater than a predetermined relief pressure for a desired time.

20. A machine, comprising:
a frame;
an engine supported by the frame;
a boom coupled to the frame;
a first hydraulic cylinder operably connected to the frame and configured to move the boom relative to the frame;
a bucket coupled to the boom;
a second hydraulic cylinder operably connected to the frame and configured to move the bucket relative to the boom; and
a controller operably connected to the first and second hydraulic cylinders, the controller configured to
a) raise the boom from a first position at a minimum lift angle of the boom to a second position at a maximum lift angle of the boom;
b) determine first head-end and first rod-end pressures of the first hydraulic cylinder as the boom is raised across a third position at a reference lift angle of the boom between the minimum and maximum lift angles;
c) determine first head-end and first rod-end pressures of the second hydraulic cylinder as the boom is raised across the third position;
d) lower the boom from the second position to the first position;
e) determine second head-end and second rod-end pressures of the first hydraulic cylinder as the boom is lowered across the third position;
f) determine second head-end and second rod-end pressures of the second hydraulic cylinder as the boom is lowered across the third position; and
g) determine a weight of a payload carried by the bucket based on the first and second head-end pressures of the first hydraulic cylinder, the first and second rod-end pressures of the first hydraulic cylinder, the first and second head-end pressures of the second hydraulic cylinder, the first and second rod-end pressures of the second hydraulic cylinder, and a determined pitch angle of the machine, wherein the payload is carried by the work tool during at least steps b, c, e, and f.

* * * * *